July 21, 1964   L. L. COPELAND   3,141,478
UNDERGROUND SEAL FOR GAS MAINS, ETC.
Filed June 25, 1962   5 Sheets-Sheet 1

INVENTOR.
LYNN L. COPELAND
BY
*Hyde W. Ballard*
ATTY

July 21, 1964   L. L. COPELAND   3,141,478
UNDERGROUND SEAL FOR GAS MAINS, ETC.
Filed June 25, 1962   5 Sheets-Sheet 2

INVENTOR.
LYNN L. COPELAND
BY
Hyde W. Ballard
ATT'Y

July 21, 1964　　　L. L. COPELAND　　　3,141,478
UNDERGROUND SEAL FOR GAS MAINS, ETC.
Filed June 25, 1962　　　　　　　　　　5 Sheets-Sheet 3

INVENTOR
LYNN L. COPELAND

BY Hyde W. Ballard
ATTY

July 21, 1964 L. L. COPELAND 3,141,478
UNDERGROUND SEAL FOR GAS MAINS, ETC.
Filed June 25, 1962 5 Sheets-Sheet 4

INVENTOR
LYNN L. COPELAND
BY
ATTY 3,141,478
UNDERGROUND SEAL FOR GAS MAINS, ETC.
Lynn L. Copeland, Philadelphia, Pa., assignor to
Rubco Products, a partnership
Filed June 25, 1962, Ser. No. 204,966
13 Claims. (Cl. 138—97)

This invention pertains to closures and more particularly to a collar and method for installing the same around the joint or other portion of an underground conduit such as a gas main.

In recent years the suppliers of illuminating and heating gas have shifted from a manufactured product to natural gas. This has created a condition that has resulted in severe leakage at the joints in the gas mains. In many situations it is impossible or extremely expensive to locate and to repair or replace sections of the mains where leaks occur. Obviously it is out of the question to tear up all underground gas mains for the purpose of replacing any sections which may at some time in the future cause leakage problems. On the other hand the serious consequences involved in gas leaks which from time to time cause explosions resulting in loss of life and property make it imperative that leaks in gas mains be effectively and promptly sealed.

The present invention has for its primary object, therefore, a method of introducing a sealing compound to a joint or other leakage area in an underground conduit from and through a relatively small excavation in the soil above the affected area in the conduit.

A further object of the invention is to provide an expendable sealing collar for insertion around a joint in an underground conduit and means for introducing sealing compound inside of the collar after it has been secured in place.

A further object of the invention is to provide a sealing collar for conduits and the like having sealing means at each end of the collar and means for introducing a compound into the collar between the sealing means.

A further object of the invention is to provide a sealing collar for underground conduits and the like adapted to enclose and effectively seal the bell in a conduit joint.

A further object of the invention is to provide a sealing collar for conduits and the like having a clamp element at opposite ends of the collar, means for introducing a sealing compound into the collar between said clamps and valve means for preventing backflow of the compound.

A further object of the invention is to provide a split sealing collar for underground conduits and the like which can be installed around underground conduits, and means for sealing the split in the collar against the pressure of a sealing compound introduced between the collar and the conduit.

A still further object of the invention is to provide in a sealing collar of the type described, external valve means for maintaining the compound in the collar under pressure.

Further objects will be apparent from the specification and drawings in which

Figure 1:
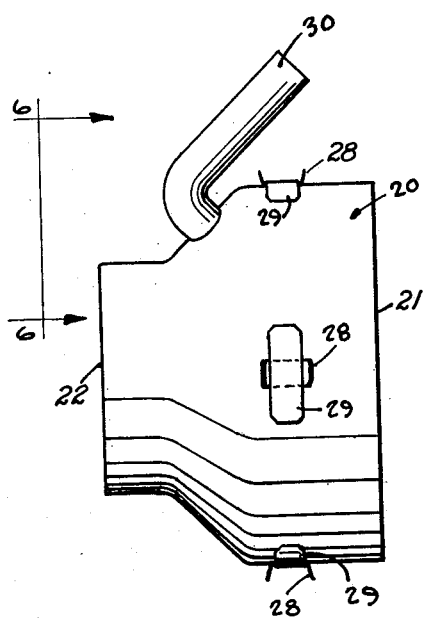
FIG. 1 is a side view of a collar for sealing a conduit having a bell joint.
Figure 3:
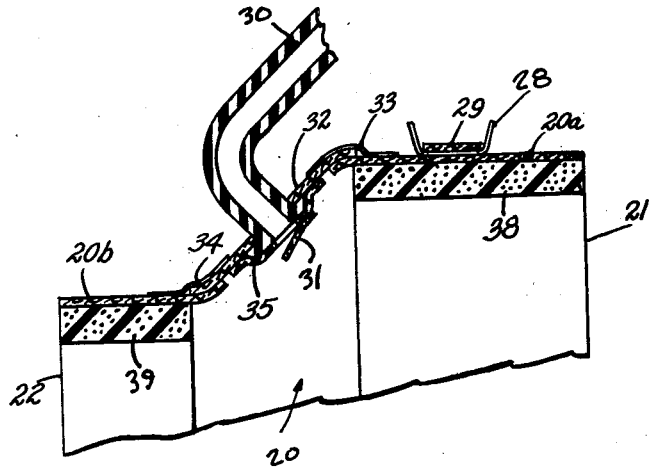
FIG. 3 is an enlarged fragmentary section as seen at 3—3 of FIG. 2.
Figures 4, 5:
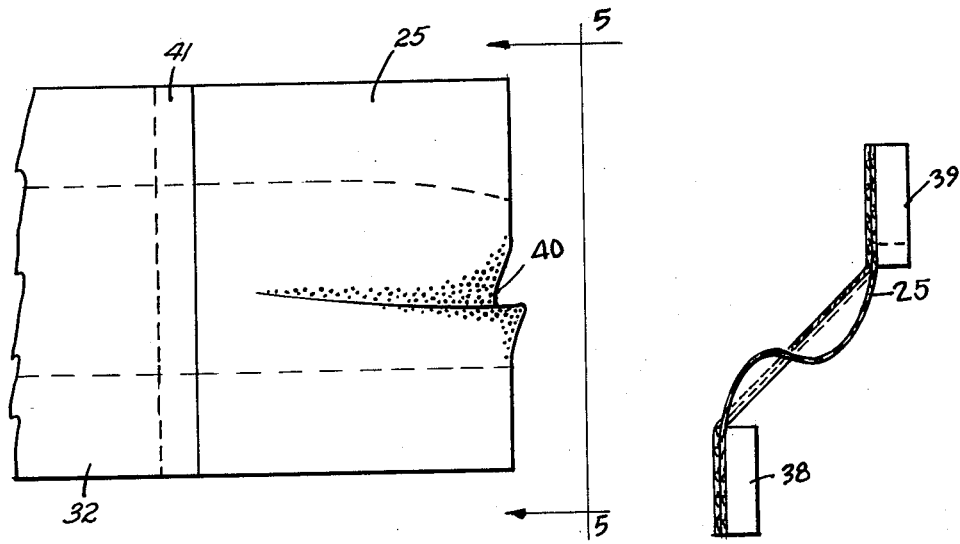
FIG. 4 is an enlarged detail as seen at 4—4 of FIG. 2.
FIG. 5 is an end view of the structure of FIG. 4.
Figure 6:
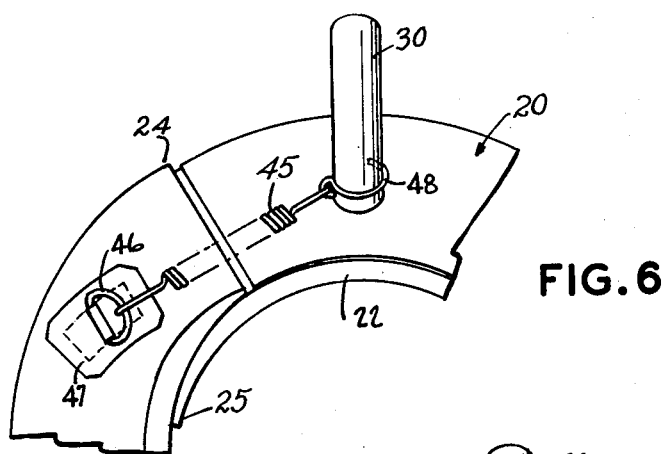
Figure 7:
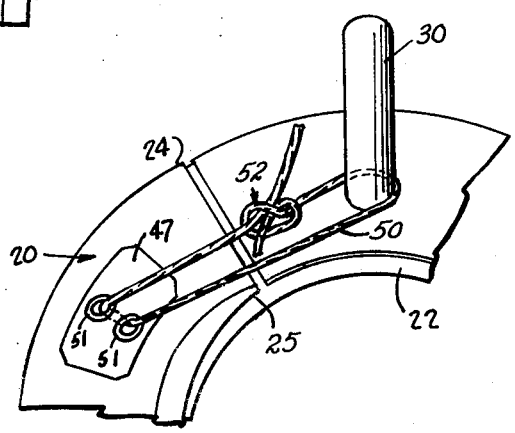
Figure 8:
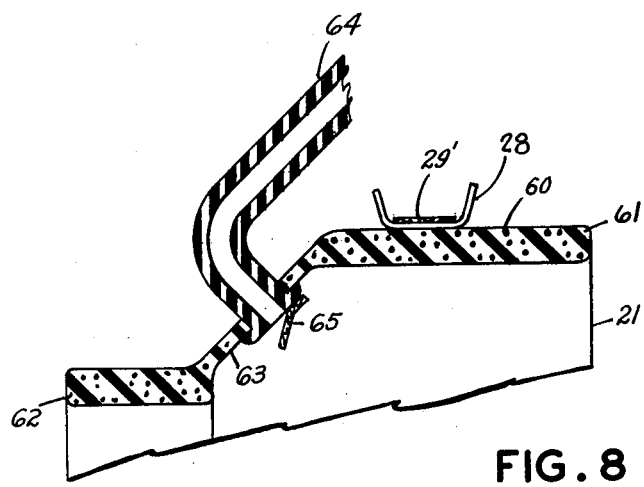
Figures 9, 10:
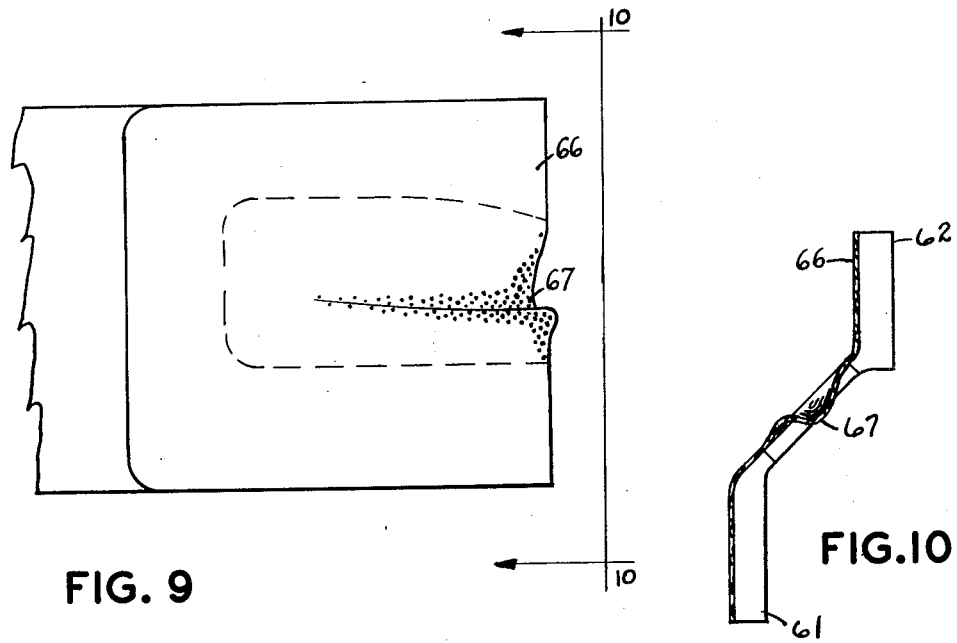
Figure 11:
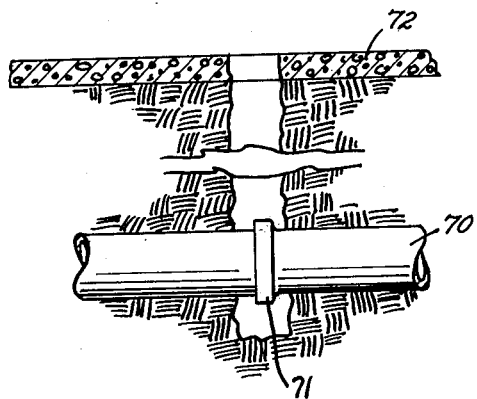
Figure 12:
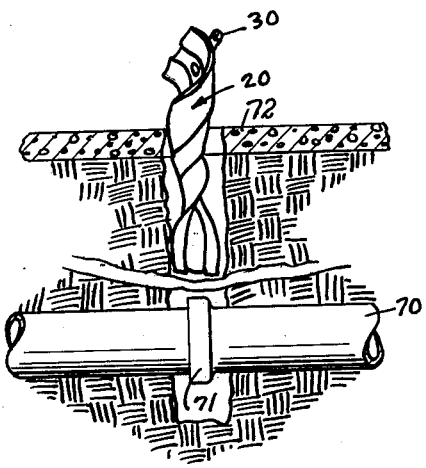
Figure 16:
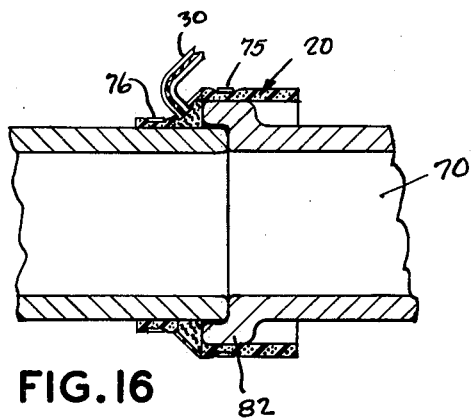
Figure 17:
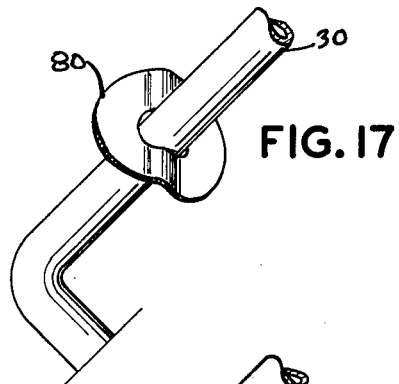
Figure 18:
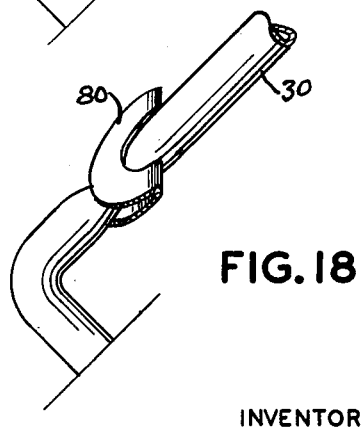
Figure 19:
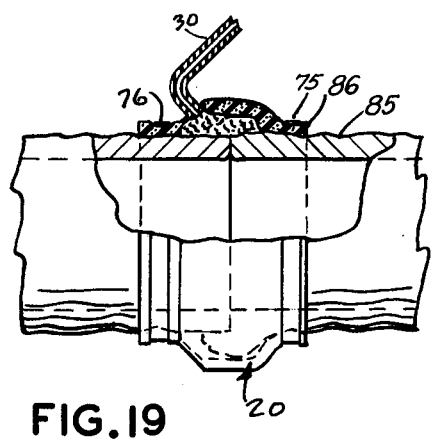

FIG. 6 is an enlarged detail showing the temporary clasping means as seen at 6—6 of FIG. 1, FIG. 7 is a view similar to FIG. 6 using a modified temporary binding arrangement, FIG. 8 is a view similar to FIG. 3 showing a sealing collar molded entirely of an elastomeric material, FIG. 9 is a view similar to FIG. 4 showing a modification for achieving a satisfactory inner seal, FIG. 10 is an end view of the structure of FIG. 9, FIGS. 11–15 illustrate schematically the method and steps employed in practicing the present invention for sealing an underground conduit, FIG. 16 is a sectional view of the conduit joint showing the collar in place and filled with compound, FIG. 17 is a perspective showing an external valve in the collar intake before crimping, FIG. 18 shows the valve element of FIG. 17 in a crimped or closed position, and FIG. 19 is a view of an underground conduit, partly sectioned, showing the manner of clamping my collar around a conduit joint having an uneven or irregular outer periphery.

The invention comprises essentially the provision of a shaped collar which is split axially so that it may be twisted into a relatively small shape or strand and threaded into an excavation which is on the order of 4" wide and 12" to 14" long. The collar is then threaded under and around the conduit joint, untwisted and connected together with an underlying flap. Each end of the collar is then clamped to the conduit, a strap or other suitable band threaded around the conduit and sealing compound is then introduced through a tube in the collar to effectively seal the joint or leak. The connection for introducing the sealing compound is then closed, either by means of an internal check valve in the collar or an external clamp. The compound introducing line is disconnected and the excavation filled.

The present invention will be described in its preferred form for use on underground gas mains of well known conventional material and size. Such gas mains are generally 4" or 6" cast iron pipes, each section having a bell on one end into which the small end of the next section is telescoped. It is to be understood, however, that the invention is not limited to the sealing of joints in underground conduits but may be used equally well for the sealing of leaks in areas of the conduits between joints and in any type of conduit whether underground or otherwise. The invention is also effective for sealing soil pipes, water pipes, or any other form of conduit or cylindrical surface where replacement of the defective portion is impractical.

Referring now more particularly to the drawings, the preferred embodiment of my invention suitable for installation around the bell of a gas main joint comprises a flexible annular envelope 20 having a large opening or terminus 21 and a smaller opening 22. The larger opening 21 is designed to comfortably fit around the bell of the gas main, whereas the smaller opening 22 is designed to enclose the body of a gas main. The envelope 20 is split as seen at 23 in FIG. 2 and has overlapping portions 24 and 25 which will be described in more detail hereinafter. The larger portion 20a of the envelope is provided with a series of U guides 28, 28 which are secured to the envelope by means of short straps 29, 29 adhesively glued to the envelope. At a position spaced approximately 90° from the joint 23, I provide a tubular pipe or inlet 30 which connects with the interior of the envelope through a flap or check valve element 31 (FIG. 3). The envelope may be fabricated in any desired manner provided it is of fully flexible material to permit being straightened out into a substantially linear form for treading into an excavation and around the main. A preferred form of the envelope comprises a rubberized fabricated case 20 in the form of an annular band which is secured to the tapered portion 32 of the envelope by means of a lap joint shown at 33. The smaller portion 20b of the envelope 20 is similarly secured to the tapered portion 32 at 34 by means of a lap joint. The inlet 30 extends through the tapered element 32 and is sealed on the inside thereof by the flange 35. The flexible elements 20a and 20b are glued or otherwise secured to split annular sleeves 38 and 39 respectively, preferably formed of sponge or foam rubber material.

The flap 25 shown in FIGS. 4 and 5 comprises a separate piece which is flared in flat pattern to provide a tuck or gather 40. Flap 25 is secured to the tapered element 32 with a lap joint 41. The purpose of the gather 40 is to provide a secure seal at the split 23 of the collar during the time that the sealing compound is introduced between the envelope 20 and the gas main. In order to hold the collar in place while it is being sealed with the sealing compound, I preferably provide a light spring 45 secured to the element 32 by means of a D-loop 46 and an overlap 47. After the collar has been worked into place around the joint of the gas main the operator retains the collar and flaps in the proper position by fastening the hook 48 attached to spring 45 around the base of the inlet tube 30. A modified form of clasp for the split in the collar is shown in FIG. 7 in which a suitable cord or thread 50 is wound around the base of inlet 30 and through eyelets 51, 51 in overlap 47 in such a manner that the operator may tighten the envelope or collar by means of a slip knot 52 in the cord 50.

Figure 2:
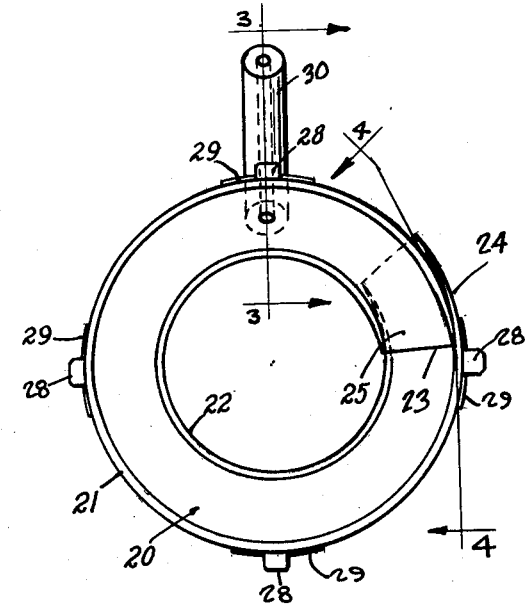
FIG. 2 is an end view of the structure of FIG. 1.

A modification of the envelope described in FIGS. 1–3 is shown in FIGS. 8–10 in which a one piece molded construction is utilized. In this form the envelope 60 has a large diameter opening 61 and a small diameter opening 62. The periphery of the envelope 60 is preferably thickened at both the small and large circular portions. These portions are joined integrally with a tapered portion 63 which may be of somewhat lesser thickness to provide sufficient resiliency and ability to twist the collar into a strand-like shape for insertion into the excavation around and underneath the gas main. The inlet 64 is also formed of an elastic flexible material and may, if desired, be secured to the tapered portion 63 or formed integrally therewith. A valve or flap 65 is provided at the inside of the inlet 64 for the purpose to be explained hereinafter. The U-guides 28 are preferably secured to the larger diameter portion 61 by means of straps 29' and if desired the smaller portions 22 and 62 of each collar may also be provided with the guides 28. In form of FIG. 8, I provide a separate flap insert or element 66 (FIG. 8) which contains a tuck or gather 67 for firmly fitting against and inside the overlapping portion of the tapered member 63.

Figure 13:
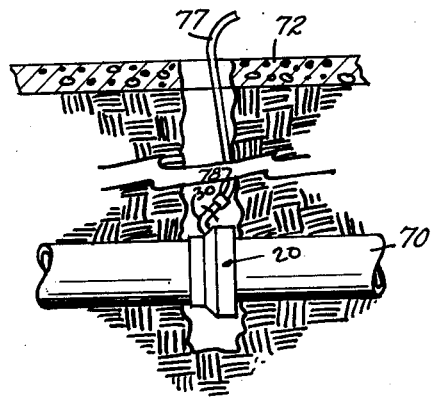
Figure 14:
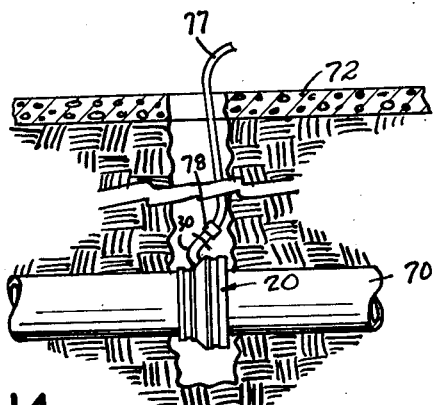
Figure 15:
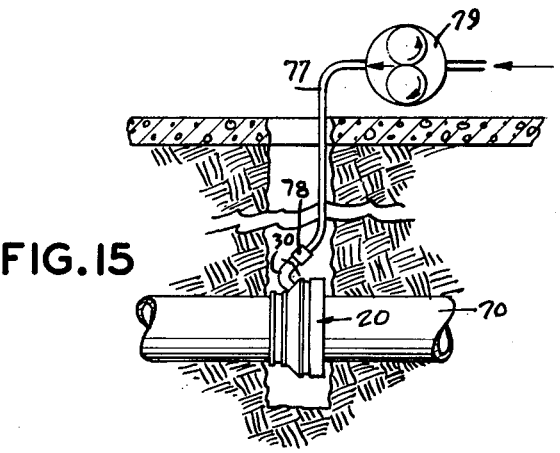

Referring now to FIGS. 11–16 the method of installing my improved conduit collar will be more fully described. A conduit such as a gas main 70 is provided with a bell joint 71. A suitable excavation in the soil and pavement 72 is made giving limited access to the area and above and immediately below joint 71. In practice it has been found that an excavation 12" to 14" wide and 4" long, i.e., in the direction of the conduit, 70 provides ample space for the installation and seal of the joint 71. After the excavation has been completed as shown substantially in FIG. 11 the envelope or collar is twisted into a semi-strand-like condition shown in FIG. 12. It is then fed downwardly into the excavation around and under the joint 71 during which portion of the operation it may be permitted to untwist. The envelope is then brought up around the joint with the inlet 30 substantially on the top as shown in FIG. 13. With the flap 25 underneath so that the tuck or gather 40 is between flap 24 and the joint 71 the operator manipulates the envelope into a snug, tight fitting position around the joint 70, and then fastens the hook 48 or the cord 50 around inlet 30 to prevent the envelope from dropping away from the joint 71 and to maintain a relatively snug fitting condition of the envelope while it is being clamped securely in position by means of straps or bands 75 and 76 (FIG. 16). Band 75 is threaded around the larger diameter portion of the envelope and in the guides 28. Band 76 is threaded around the smaller portion 20b of the envelope whereupon both bands 75 and 76 are securely clamped to compress the annular portions 38 and 39 of the envelope against the conduit joint. As soon as bands 75 and 76 are securely in place a hose or other flexible connection 77 is secured to inlet 30 by means of a suitable coupling 78. Hose 77 extends to a pump 79 or other pressurized source of supply for the sealing compound which is then forced through hose 77 inlet 30 to the space between the envelope 20 and joint 71.

Referring now to FIG. 2 the location of inlet 30 with respect to the joint or split 23 is of importance in sealing the split. After the sealing compound enters the envelope through inlet 30 it is in a relatively viscous condition. It will gradually force its way around the periphery of the joint, both clockwise and counter-clockwise as seen in FIG. 2. By locating the split 23 substantially near the inlet 30 I insure that the sealing compound moves around the inside of the envelope to expand the inner flap 25 outwardly against the outer flap 24 by means of the movement of the compound in a clockwise direction as seen in FIG. 2. Should the compound moving in a counter-clockwise direction as seen in FIG. 2 reach the inner flap before the compound moving in a clockwise direction, the compound would, of course, force its way between the flaps and leak through the joint. By applying this initial pressure to the split or joint 28 in a circular direction in which the initial flap is positioned I always provide a tight seal between the two flaps. This seal is enhanced by the provision of tucks or gathers 40 (FIG. 4) and 67 (FIG. 9), so that there is ample material on the edge of the inner flap in either form of the envelope to seal against the inside of the outer flap, even under conditions of limited expansion.

It has been found that a substantially 90° position for the edge of the inner flap 25 with regard to the inlet 30 produces excellent results. However, this may be varied from a point closer to the inlet up to but not exceeding 180° therefrom. As soon as the space around the conduit has been filled with a sealing compound up to the desired pressure the hose 77 may be disconnected and the check valve 31 or 65 as the case may be, prevents the compound from flowing back through inlet 30 or 64. A secondary seal may be used with the check valve 31 or 65 or the check valve may be omitted and the secondary seal shown in FIGS. 17 and 18 used exclusively. This seal comprises a crimped washer 80 installed over the inlet 30 which may be flattened to a clamping or sealing position as shown in FIG. 18 thus effectively closing the inlet.

Venting of the closure may be accomplished in one or more of several ways during the introduction of the sealing compound. It has been found that the use of an open cell or spronge rubber material 38 or 39 permits the passage of sufficient air to vent the envelope during the introduction of the compound but no leakage of the compound occurs. In any event the bands 75 and 76 are not drawn so tightly that escape of all air or gas from the leaking joint is prevented.

In the event that the surface of the joint 71 is very uneven, pitted or if the periphery of the bell 82 on the main is extremely narrow the larger diameter portion 61, 20a of the collar is securely clamped around the smaller periphery 85 of the conduit in back of the bell 82. Ordinarily it is desirable to apply the clamping strap 75 around the bell and as close to the joint as possible by utilizing an elongated large diameter portion 20a on the collar. Considerable latitude is provided for applying the clamp 29 or 29' in the event that a better seal can be obtained by relocating the strap 29 at or near the edge 86 of the collar as seen in FIG. 19.

The source of sealing compound may be a pressurized tank instead of the pump 79 or any other convenient above ground source for supplying the particular type of compound best suited to the installation. The collar may be made in any desired size but the extent of overlap permits a single size to be successfully employed on conduits of several standard dimensions. As stated above, the usual collar can be used on both 4" and 6" conduits including any variations in size which may occur in the regular production of such pipes. In locations where suitable access can be obtained, the bands and/or the temporary locating means may be in the form of a slide fastener. The overlap of the flaps is also important in preventing blowouts and the pucker or tuck greatly assists in this feature since it provides a perfectly tight seal between the underlying flap and the overlying flap. A further advantage of the present invention resides in the fact that it is possible to seal against moist or wet surfaces.

With regard to the compound employed the choice depends in large measure upon the particular conditions which may exist. Examples of suitable compounds which should preferably be thermosetting are the polysulfides, borosulfonated polyethylene, neoprene and epoxys.

It will be understood that I have provided a most effective method and means for quickly sealing leaks which occur at the joints and elsewhere in relatively large conduits. The invention is particularly concerned with the proper sealing of such conduits where the portion to be sealed is in relatively inaccessible locations as is the case when the conduits are buried under pavement, streets and roadways that cannot be completely torn up without seriously disrupting traffic and at considerable time and expense. The device is readily installed, inexpensive to manufacture and provides an effective seal which is installed in such a manner that the excavation, if such is required, can be immediately filled in and the surface of the thoroughfare permanently repaired.

Having thus described my invention, I claim:

1. A one piece collar for enclosing the periphery of a cylindrical object such as a conduit or the like which comprises an elongated flexible body portion having an axial lap joint, said body portion being of one piece and adapted to extend 360 degrees around a conduit, means for clamping said collar to and around the conduit in spaced relation at each side of the portion of the conduit to be sealed, and an inlet in the collar, for introducing a sealing compound around the conduit in said portion to be sealed.

2. A collar in accordance with claim 1 having check means for preventing backflow of the sealing compound through the inlet.

3. A collar in accordance with claim 1 having a smaller diameter portion, a larger diameter portion, and a tapered connection between said portions.

4. A collar in accordance with claim 1 having guide means for positioning at least one of the clamps around the periphery of the collar.

5. A collar in accordnace with claim 1 formed of flexible fabric, and a resilient sponge-like collar secured inside and around each end of said fabric.

6. A collar assembly in accordance with claim 1 having means for initially holding the lap joint in place during the positioning of the clamp means.

7. A collar for sealing the joint of an underground conduit and the like comprising a flexible body member capable of being twisted into a strand-like condition, a flap at one end of said body member adapted to underlie the opposite end of the body member when pushed around a cylindrical conduit, a puckered area in said flap, an inlet tube providing access to the inside of the collar said inlet tube being located less than 180° from the puckered portion of the flap, means associated with said inlet tube for preventing backflow of the sealing compound introduced through the tube under pressure, and means for clamping the overlapped collar around the periphery of the conduit at axially spaced distances from the area on the conduit to be sealed.

8. A collar in accordance with claim 7 integrally molded of elastomeric material.

9. A collar in accordance with claim 7 having a large diameter portion for clamping around the bell of the conduit and a smaller diameter portion for clamping around the body of an adjacent conduit section.

10. A collar in accordance with claim 7 having means for retaining the lap joint in position around the conduit prior to and during the installation of the clamping means.

11. The method of sealing an area in an underground conduit which comprises the steps of excavating a relatively narrow shaft above an area in the conduit to be sealed, twisting a flexible collar into a strand-like condition, threading said twisted collar into the excavation around the portion of the conduit to be sealed, untwisting the collar, positioning the collar to form a lap joint around the conduit, applying a temporary holding member for retaining the collar in said overlapped position, clamping the collar to the conduit in positions axially spaced from each other and enclosing the area to be sealed, and introducing a sealing compound between the outer periphery of the conduit and the collar.

12. The method in accordance with claim 11 including the step of introducing a thermosetting sealing compound into the collar.

13. The method of claim 11 including the step of preventing backflow of the sealing compound.

References Cited in the file of this patent

UNITED STATES PATENTS

| 1,800,085 | Kraeger et al. | Apr. 7, 1931 |
| 1,925,538 | Knopp | Sept. 5, 1933 |
| 2,163,261 | Norton | June 20, 1939 |
| 2,756,474 | Steinmetz | July 31, 1956 |
| 2,917,085 | Douse | Dec. 15, 1959 |
| 3,084,719 | Wallace et al. | Apr. 9, 1963 |

FOREIGN PATENTS

| 641 | Great Britain | July 9, 1907 |
| 17,760 | Great Britain | May 11, 1911 |

Notice of Adverse Decision in Interference

In Interference No. 94,706 involving Patent No. 3,141,478, L. L. Copeland, UNDERGROUND SEAL FOR GAS MAINS, ETC., final judgment adverse to the patentee was rendered Aug. 3, 1965, as to claims 1, 2, 3, 5, 6, 7, 9, 10, 11, 12 and 13.

[*Official Gazette September 28, 1965.*]